United States Patent

Kato et al.

[11] Patent Number: 5,823,680
[45] Date of Patent: Oct. 20, 1998

[54] TEMPERATURE SENSOR

[75] Inventors: Nobuhide Kato, Aichi-prefecture; Nobukazu Ikoma, Nagoya, both of Japan

[73] Assignee: NGK Insulators, Ltd., Nagoya, Japan

[21] Appl. No.: 815,431

[22] Filed: Mar. 11, 1997

Related U.S. Application Data

[63] Continuation of Ser. No. 354,828, Dec. 8, 1994, abandoned.

[30] Foreign Application Priority Data

Dec. 27, 1993 [JP] Japan ................................. 5-329306

[51] Int. Cl.$^6$ .............................. G01K 7/18; H01C 3/04; H01C 1/012
[52] U.S. Cl. ......................... 374/185; 374/183; 338/25; 338/28; 338/17; 338/314
[58] Field of Search .................... 374/185, 183; 338/25, 28, 17, 314

[56] References Cited

U.S. PATENT DOCUMENTS

| | | | |
|---|---|---|---|
| 3,538,771 | 11/1970 | Akeley | 374/183 |
| 3,842,674 | 10/1974 | Wilbur et al. | 374/183 |
| 3,895,292 | 7/1975 | Zair et al. | 374/183 |
| 3,933,046 | 1/1976 | Ebrecht | 374/183 |
| 4,169,243 | 9/1979 | Payne et al. | 374/183 |
| 4,464,646 | 8/1984 | Burger et al. | 338/25 |
| 4,901,051 | 2/1990 | Murata et al. | 338/25 |
| 4,906,968 | 3/1990 | Gershenfeld et al. | 338/25 |
| 5,053,740 | 10/1991 | Schultz et al. | 374/185 |
| 5,140,302 | 8/1992 | Hara et al. | 374/183 |
| 5,171,091 | 12/1992 | Krüger et al. | 374/183 |
| 5,172,466 | 12/1992 | Friese et al. | 29/612 |
| 5,181,007 | 1/1993 | Friese et al. | 338/25 |
| 5,197,804 | 3/1993 | Tani et al. | 338/28 |
| 5,199,791 | 4/1993 | Kasanami et al. | 374/185 |
| 5,406,246 | 4/1995 | Friese et al. | 338/25 |
| 5,410,291 | 4/1995 | Kuzuoka | 374/185 |
| 5,430,428 | 7/1995 | Gerblinger et al. | 338/25 |

FOREIGN PATENT DOCUMENTS

| | | |
|---|---|---|
| 0 309 664 A2 | 4/1989 | European Pat. Off. |
| 0 446 667 A2 | 9/1991 | European Pat. Off. |
| 0 461 102 A2 | 12/1991 | European Pat. Off. |
| 0 447 514 B1 | 9/1993 | European Pat. Off. |
| 2 256 203 | 5/1973 | Germany . |
| 3 829 764 A1 | 3/1989 | Germany . |

(List continued on next page.)

OTHER PUBLICATIONS

K. Wetzel, "Temperaturmessung Mit Heissleitern", Elektor 26 (Jan. 1988).
J. Scholz, "Temperatur–Sensoren für den industriellen Einsatz", 29 *Industrie–elektrik + elecktronik* pp. 34–41 (1984).
Bernard Montaron, "Automotive Thick Film Temperature Sensors", Society of Automotive Engineers, 1983, 830105.
G.S. Iles, "Platinum Film Temperature Sensors", Society of Automotive Engineers, 1975, 750225.
Mohan Dutt, "Temperature Measurement Utilizing Platinum Resistance Sensors", Society of Automotive Engineers, 1974, 741076.

*Primary Examiner*—Diego F. F. Gutierrez
*Attorney, Agent, or Firm*—Kubovcik & Kubovcik

[57] ABSTRACT

A temperature sensor includes a ceramic substrate, and a sensing resistor containing platinum is embedded in the ceramic substrate. Electric current can be applied to the sensing resistor through the lead. The voltage of the sensing resistor can be detected through the second lead. Another resistor for dividing voltage is electrically connected to the sensing resistor, the resistor is trimmed by laser irradiation so as to adjust its electrical resistance value such that upon applying electric current having a certain value onto the sensing resistor an output voltage having a predetermined value is generated. Heat generated by the laser irradiation to the resistor does not affect an electrical resistance value of the resistor as much as that of the sensing resistor, thereby improving precision of the temperature sensor. The sensing resistor avoids contact with the atmosphere.

16 Claims, 4 Drawing Sheets

FOREIGN PATENT DOCUMENTS

| | | |
|---|---|---|
| 3 029 446 C2 | 12/1990 | Germany . |
| 4 118 466 A1 | 12/1991 | Germany . |
| 4 026 061 C1 | 2/1992 | Germany . |
| 4 025 715 C1 | 4/1992 | Germany . |
| 0221225 | 9/1988 | Japan ..................................... 374/183 |
| 4-279831 | 10/1992 | Japan . |
| 2 120 453 | 11/1983 | United Kingdom . |
| 2 209 630 | 5/1989 | United Kingdom . |

EXHAUST GAS

TEMPERATURE SENSOR

This application is a continuation of application Ser. No. 08/354,828 filed Dec. 8, 1994, now abandoned.

BACKGROUND OF THE INVENTION

1. Field of the Invention

The present invention relates to a temperature sensor or a resistance thermometer using platinum or a cermet of platinum and a metal as a resistor. The temperature sensor of the present invention improves reliability at high temperatures and precision.

2. Description of Related Art

A temperature sensor or a resistance thermometer has a sensing resistor having an electrical resistance varying with temperature. The temperature sensor is driven by a constant current source in order to develop voltages across the changing resistance of the sensing resistor. A temperature sensor having a platinum film is disclosed in a preprint "Platinum Film Temperature Sensors" by G. S. Iles for Automotive Engineering Congress and Exposition, Detroit, Mich., Feb. 24–28, 1975, held by Society of Automotive Engineers.

Japanese Patent Application Laid-Open No. 4-279831 discloses a temperature sensor including a ceramic substrate, a platinum resistor coated thereon, and a glass layer coated onto the platinum resistor. Before being coated by the glass layer, the platinum resistor on the substrate is trimmed by laser irradiation so as to have electrical resistance of a predetermined value.

However, in the step of trimming the platinum resistor, the laser irradiation heats the resistor thereby changing its electrical resistance. Consequently, it is not easy to improve precision in an ohmic resistance value of the resistor, and variance of the ohmic resistance value tends to increase. Moreover, the glass layer may not withstand high temperatures, and the temperature sensor may not be used at high temperatures.

In some of applications, the temperature sensor is used under demanding conditions, for example, at high temperatures as well as in an oxidizing atmosphere, a reducing atmosphere, and an atmosphere containing a corrosive gas. For example, temperatures of an exhaust gas from an internal combustion engine and an exhaust gas from a plant may need to be monitored. Under these conditions, the resistor of the temperature sensor may gradually change its electrical resistance value over a long period.

SUMMARY OF THE INVENTION

An object of the present invention is to solve the aforementioned problem. The present invention provides a temperature sensor comprising a ceramic substrate; a sensing resistor, being embedded in the ceramic substrate, having a positive temperature coefficient of resistance; a first lead connected to the sensing resistor, wherein electric current can be applied to the sensing resistor through the first lead; a second lead connected to the sensing resistor, wherein a voltage of the sensing resistor can be detected through the second lead; a second resistor electrically connected to the sensing resistor, the second resistor having an electrical resistance value such that upon applying electric current having a certain value the sensing resistor has output voltage having a predetermined value.

In the temperature sensor of the present invention, a sensing resistor (2) is embedded in a ceramic substrate (1, 11, 18) so that the sensing resistor avoids contact with an atmosphere to be sensed thereby the sensing resistor does not deteriorate. Consequently, the temperature sensor of the present invention remains stable and reliable even under demanding conditions, such as an oxidizing atmosphere at high temperatures, a reducing atmosphere at high temperatures, an atmosphere containing a corrosive gas, etc.

A ceramic material for the ceramic substrate preferably insulates electricity. The ceramic material preferably has low thermal conductivity so as to decrease the heat flow between the sensing resistor and another resistor through the ceramic substrate, thereby improving the precision of the temperature sensor. The ceramic substrate may be composed of, for example, alumina, stearite, mullite, etc. Preferably, the entirety of the ceramic substrate may consist of the same ceramic material. However, part of the ceramic substrate may be composed of a different ceramic material from the other parts of the ceramic substrate. The ceramic substrate may be dense so as to prevent gas molecules from permeating therethrough.

The ceramic substrate may have a planar shape. However, the ceramic substrate may have any shape including a tubular shape and a cylindrical shape. The ceramic substrate favorably has a shape such that heat that is experienced at the sensing resistor does not affect the temperature of the voltage-dividing resistor.

The sensing resistor contains a metal having a positive temperature coefficient of resistance. The positive temperature coefficient of resistance is preferably large. The metal may include, for example, platinum, rhodium, nickel, tungsten, etc., and especially platinum is favorable. The sensing resistor may be composed of any of these metals, an alloy including any of these metals, or a cermet consisting of a ceramic material and any of these metals. The temperature sensor of the present invention can measure temperature by properties that the sensing resistor changes its electrical resistance depending on temperature.

A resistor for dividing voltage is electrically connected to the sensing resistor by means of, for example, a pair of leads. In contrast to the sensing resistor, the voltage-dividing resistor preferably has a small temperature coefficient of resistance in terms of absolute value. In other words, upon varying temperatures, a voltage-dividing resistor preferably does not change its electrical resistance much. The voltage-dividing resistor may be made by printing a metal or metal oxide. Alternatively, the voltage-dividing resistor may be made of a glass matrix and particles dispersed therein, and the particles are made of a metal or a metal oxide. Alternatively, the voltage-dividing resistor may include a film made of a metal or metal oxide and a metal wire.

The voltage-dividing resistor may preferably be coated onto a surface of the ceramic substrate so that the voltage-dividing resistor is easily trimmed by laser irradiation so as to adjust output voltage. Upon applying electric current the output voltage is generated. During the laser irradiation, electric current having a certain value is applied to the sensing resistor and the voltage-dividing resistor at a certain temperature, for example, at 25° C. while output voltage is detected. The voltage-dividing resistor is trimmed such that the backward voltage of the sensing resistor has a predetermined value, which corresponds to the electric current and an electric resistance value.

In the present invention, the output voltage of the temperature sensor has a small variance. In the present invention, the voltage-dividing resistor having a small temperature coefficient of resistance is trimmed by laser irradiation instead of the sensing resistor having a large temperature coefficient of resistance, and heat generated by the laser irradiation does not affect an electrical resistance value of the voltage-dividing resistor as much, thereby reducing error in the output voltage. In the present invention, the backward voltage of the sensing resistor is monitored during the trimming step so as to substantially decrease the effects of electrical resistance changes in the leads due to temperature changes, thereby decreasing a variance of the output voltage.

Preferably at 25° C. the second resistor has electrical resistance larger than one hundred times as much as electrical resistance of the sensing resistor so as to improve the precision of the temperature sensor. Further preferably at 25° C. the second resistor has electrical resistance larger than one thousand times as much as electrical resistance of the sensing resistor.

In the present invention, the voltage-dividing resistor may be disposed at a position that the voltage-dividing resistor is not exposed to an atmosphere to be sensed. In this arrangement, the voltage-dividing resistor remains reliable, and an electrical resistance value of the voltage-dividing resistor does not change much over a long period.

Preferably the ceramic substrate may have two ends, the sensing resistor may be disposed in one of the two ends, and the voltage-dividing resistor may be disposed in the other end.

The voltage-dividing resistor is preferably disposed at a position that has a certain distance from the sensing resistor so as to reduce the heat flow between the voltage-dividing resistor and the sensing resistor. This is especially the case when the temperature sensor detects high temperatures. While the sensing resistor is exposed to high temperatures, for example, at 1000° C., the voltage-dividing resistor is kept at much lower temperatures, for example, at about 300° C., resulting in a longer service life of the voltage-dividing resistor.

The voltage-dividing resistor is preferably coated with the glass layer so as to improve durability. In the embodiment that the voltage-dividing resistor has a certain distance from the sensing resistor to reduce heat conduction, the glass layer may withstand higher temperatures.

A method of coating the glass layer onto the voltage-dividing resistor may include the steps of making a slurry including glass (for example, borosilicate lead) powder, applying the slurry onto the surfaces of the voltage-dividing resistor, drying the slurry thereon, and firing the slurry thereon. The slurry applying step can be carried out by immersion, blade coating, spray coating, etc.

In the temperature sensor of the present invention, upon applying electric current to the sensing resistor, the sensing resistor generates voltage, and the voltage signal is detected. The voltage signal may be then converted, for example, by a central processing unit to show temperature. Even when the leads, terminal pads, and side connections have some electrical resistance, the temperature sensor keeps the precision to detect temperatures. A lead may be used to transmit electric signals, such as voltage, from the sensing resistor, and the lead may be connected to the sensing resistor. Alternatively, electric power having a certain voltage may be applied to the sensing resistor while an electric current value is detected.

The sensing resistor, the second resistor, the leads, and the terminal pads may preferably be printed so as to form a film. However, these elements also may be formed by blade coating, spray coating, and so on.

BRIEF DESCRIPTION OF THE DRAWINGS

Further details are explained below with the help of the embodiments illustrated in the attached drawings.

DETAILED DESCRIPTION OF THE PREFERRED EMBODIMENTS

Figure 1:
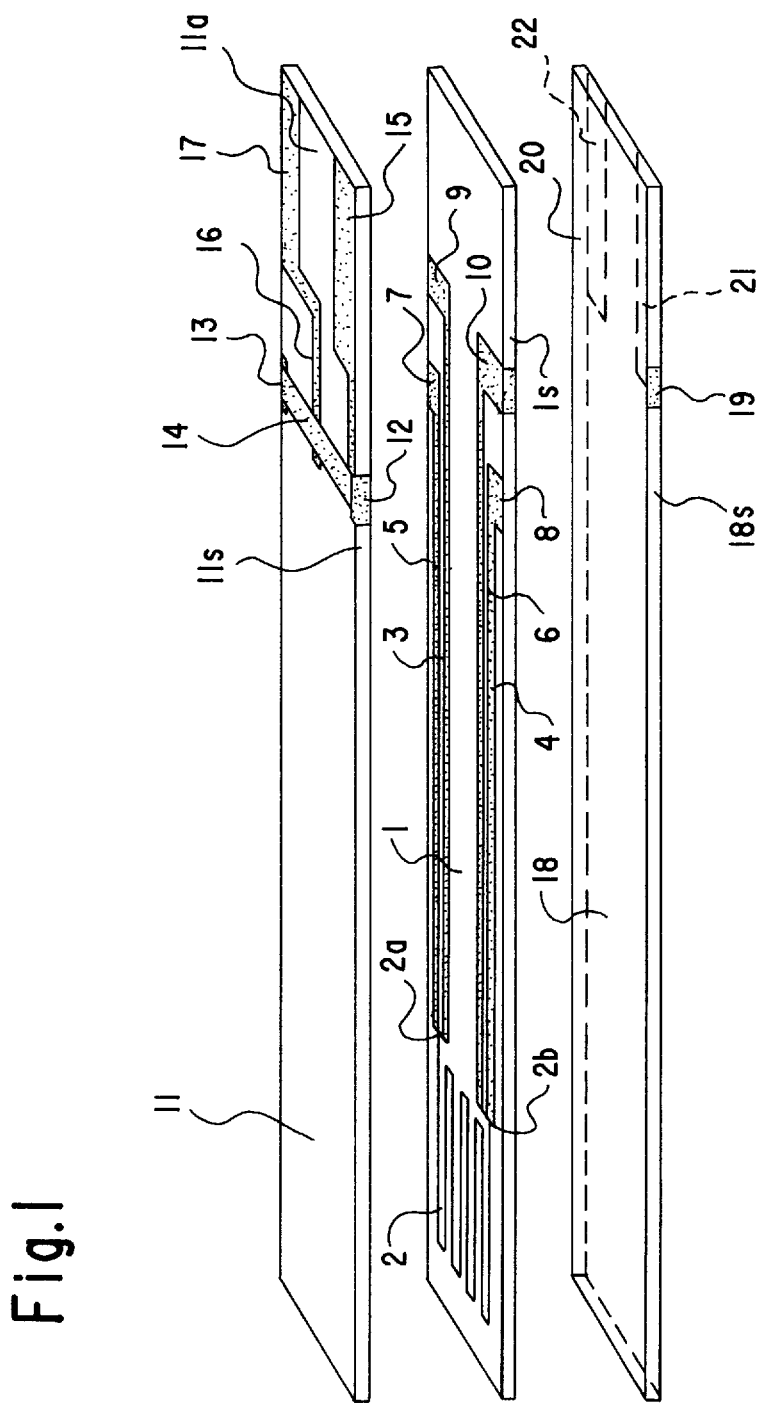
FIG. 1 is a perspective view of the first embodiment of the temperature sensor of the present invention wherein the ceramic substrate is separated into three sheets.
Figure 7:
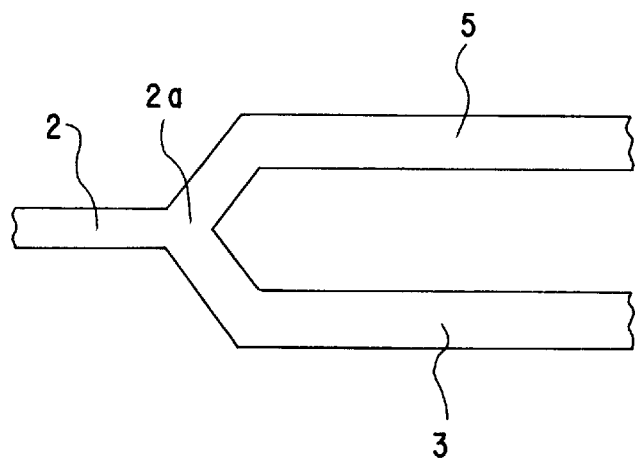
FIG. 7 is an expanded view of a part of FIG. 1.

FIG. 1 shows the first embodiment of the temperature sensor of the present invention, and the ceramic substrate 1, 11, 18 is separated into three sheets for clarity. FIG. 1 can be seen as showing a process of making the first embodiment also. FIG. 7 is an expanded view of a part of FIG. 1.

In FIG. 1, a sensing resistor 2, which is composed of a paste mixture of platinum and alumina, is printed onto a surface of a ceramic sheet 1. During the printing step, the ceramic sheet is green alumina that is not fired yet.

A pair of current leads 3, 4 are also printed onto a surface of the ceramic sheet 1. One end of both of the current leads 3, 4 connects to the ends of the resistor 2. The other ends of the current leads 3, 4 connect to connecting pads 9, 10 respectively, for ensuring connection with a side surface 1s.

A pair of leads 5, 6 is printed onto the surface of the ceramic sheet 1 also. Voltage generated at the resistor 2 can be detected through the second leads 5, 6. One end of both of the leads 5, 6 connects to the ends of the resistor 2. The other ends of the second leads 5, 6 connect to connecting pads 7, 8, respectively, for ensuring connection with a side surface 1s. One end 2a of the resistor 2 diverges into the current lead 3 and the lead 5 (see FIG. 7), while the other end 2b of the resistor 2 diverges into the current lead 4 and the lead 6.

Current leads 3, 4, leads 5, 6, and connecting pads 9, 10 may be composed of, for example, a paste mixture of platinum and alumina. They are preferably printed in the step of printing the resistor 2. However, materials for current leads 3, 4, leads 5, 6, and connecting pads 7, 8 may not be the same as that for the resistor 2.

A ceramic substrate 11 is preferably made of the same material for the ceramic substrate 1. Side connections 12, 13 for electrically connecting the connecting pad 9, 10 are printed onto side surface 11s of the ceramic substrate 11.

The side connection 12 electrically connects to a terminal pad 15. A pad 16 for dividing voltage is printed between the side connections 12, 13. The pad 16 connects to another terminal pad 17. The terminal pad 15 does not cross the terminal pad 17.

The terminal pads 15, 17 and the pad 16 are printed onto a surface of an end 11a of the ceramic substrate. The terminal pads 15, 17 and the pad 16 may be composed of a paste mixture of platinum and alumina. However, materials for the terminal pads 15, 17 and the pad 16 may not be the same as that for the resistor 2.

A ceramic substrate 18 is preferably made of the same material for the ceramic substrate 1. Side connections 19, 20 extending to a back surface of the ceramic substrate are printed onto side surface 18s of the ceramic substrate 18. The side connections 19, 20 connect to terminal pads 21, 22, respectively printed onto a back surface of the ceramic substrate. The side connections 19, 20 and terminal pads 21, 22 may be composed of a paste mixture of platinum and alumina. However, materials for the side connections 19, 20 and terminal pads 21, 22 may not be the same as that for the resistor 2.

The three green ceramic substrates 1, 11, 18 are laminated together, pressed, and then fired at 1,600° C. so as to form a unitary piece. When the resistor 2 contains tungsten or nickel, the atmosphere in the firing step may be a reducing atmosphere. When the resistor 2 contains platinum or rhodium, the atmosphere may be either a reducing atmosphere or an oxidizing atmosphere.

A resistor 14 for dividing voltage, which is composed of a mixture of ruthenium oxide and glass is printed and fired so as to connect side connections 12, 13. The resistor 14 coats at least a part of the pad 16 for dividing voltage so as to connect to the pad 16. For example, the resistor 14 may have electrical resistance of 50 kiloohms, and the sensing resistor may have electrical resistance of 20 ohms.

Electric current having a certain value is applied to the resistor 2 through the terminal pads 21, 22 while an output voltage from the resistor 2 is detected through the terminal pads 15, 17. Under these conditions, the resistor 14 for dividing voltage is trimmed by laser irradiation so as to give an output voltage having a certain value corresponding to the electric current. After trimming, the resistor 14 may be coated by a glass layer so as to protect the resistor.

In the trimming step, an infrared laser or an ultraviolet laser may be used. For example, a yttrium aluminum garnet laser generates a ray having a diameter of 50 μm onto the resistor 14 moving at a rate of 0.25 mm per second. The laser may have an oscillating frequency of one kilohertz and a power of 600 milliwatts.

Figure 8:
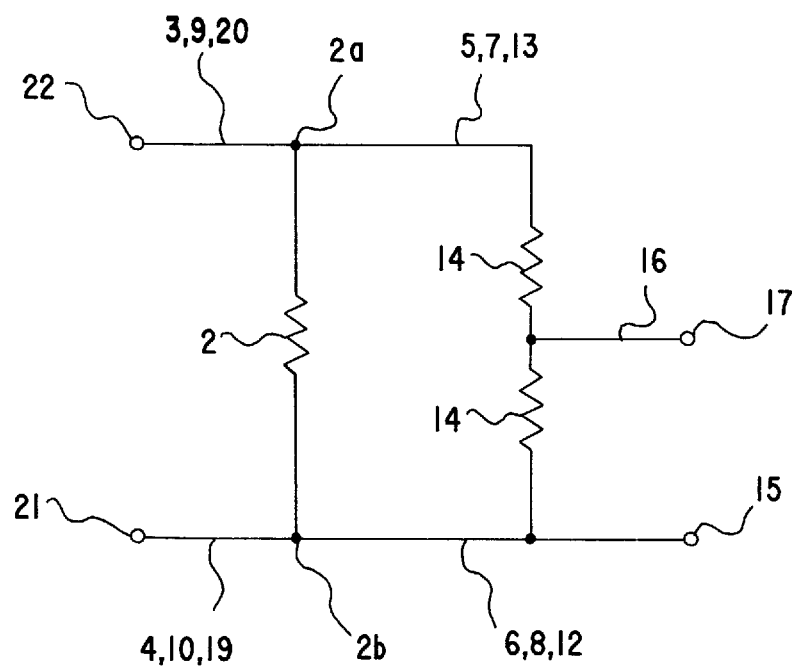
FIG. 8 is a schematic circuit diagram of the first embodiment of the temperature sensor of the present invention.

The electrical circuit is illustrated in FIG. 8. The electrical circuit has temperature sensitive resistor 2 and voltage-dividing resistor 14, which are in parallel. Electric current is applied to the sensing resistor 2 by input terminals 21, 22. Voltage generated at the sensing resistor 2 is divided by the resistor 14 so as to give output voltage at output terminals 15, 17.

As the temperature of the sensing resistor 2 varies, upon applying constant electric current, the electrical resistance of the sensing resistor 2 varies so as to change the voltage generated at the sensing resistor 2, thereby the output voltage at output terminals 15, 17 changes accordingly.

Figure 2:
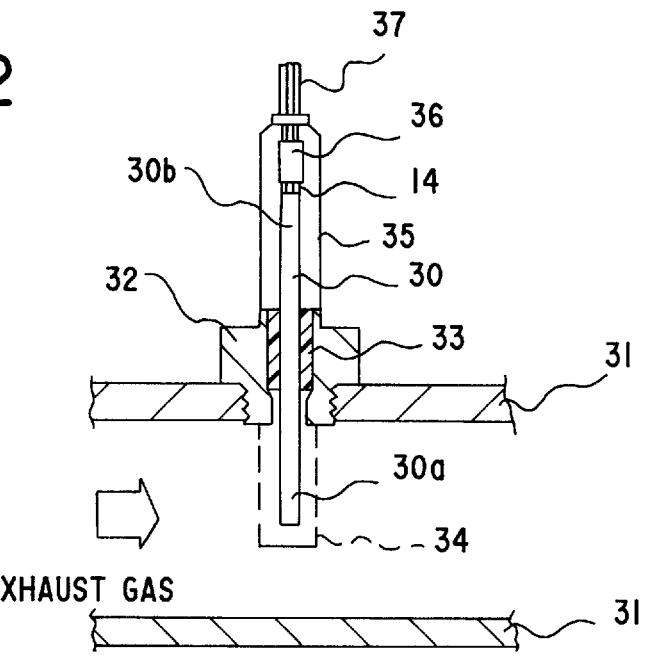
FIG. 2 is a cross section showing a manner of using the temperature sensor.

FIG. 2 shows a manner of using a temperature sensor 30 in the exhaust system of an automobile. The temperature sensor 30 is attached to an exhaust pipe 31 by means of a housing 32. One end 30a, which the resistor 2 is embedded in, is inserted into the inside of the exhaust pipe 31, while the other end 30b having the resistor 14 is disposed on the outside of the exhaust pipe 31. The housing 32 is threadedly engaged to the exhaust pipe 31, and a member 33 for absorbing shock is disposed between the housing 32 and the temperature sensor 30.

The end 30a is covered by a protection cover 34 so as to avoid an impact on the end since the ceramic substrate of the temperature sensor 30 may be vulnerable to the impact. The protection cover 34 is perforated so as to introduce an exhaust gas into the inside of the protection cover 34.

The other end 30b is connected to a connector 36 so that electric signals at terminal pads 15, 17, 21, 22 are transmitted to lines 37. The end 30b and the connector 36 are installed in a casing 35.

In a method of making the first embodiment, three green ceramic sheets 1, 11, 18 are laminated together, pressed, and then fired so as to form a unitary piece. However, three green ceramic sheets may not be required to make the first embodiment. For example, without the green ceramic sheet 18, terminal pads electrically connected to connection pads 9, 10 may be printed onto a back surface of the green ceramic sheet 1, which is opposite to the surface that the resistor 2 is printed onto.

Figure 3:
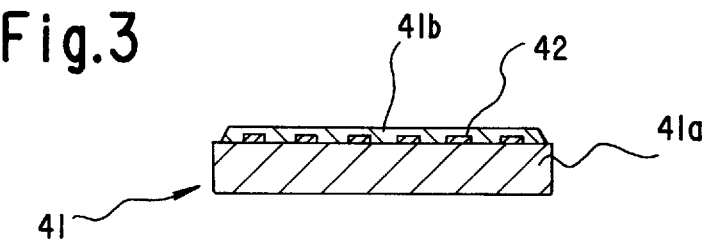
FIG. 3 is a cross section of the second embodiment of the temperature sensor of the present invention.

In FIG. 3, the second embodiment is similar to the first embodiment except that one end of the ceramic sheet 41a is coated by a coating layer 41b made of a ceramic material so that a sensing resistor 42 is embedded in the ceramic substrate 41 while the other end of the ceramic sheet 41a is not coated by the coating layer 41b. In the second embodiment, the ceramic substrate 41 has the ceramic sheet 41a and the coating layer 41b, and the sensing resistor 42 is disposed between the ceramic sheet 41a and the coating layer 41b. Leads are connected to the sensing resistor 42, and parts of the leads are coated by the coating layer 41b also. The other parts of the leads and a resistor for dividing voltage are coated by a glass layer.

In a method of making the second embodiment of the present invention, a ceramic paste is coated onto a surface of one end of the green ceramic sheet 1 so that the resistor 2 is coated by the ceramic paste. However, the other end is not coated by the ceramic paste. The green ceramic sheet is fired with the paste so as to form a unitary piece.

Figure 4:
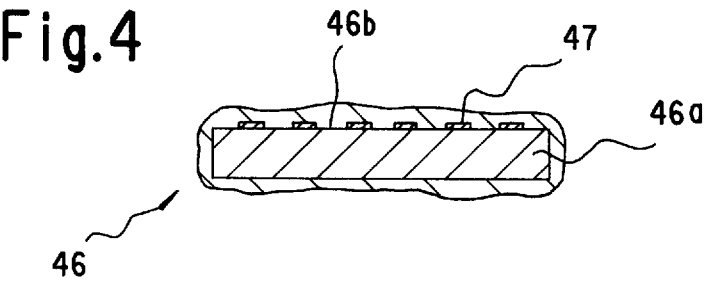
FIG. 4 is a cross section of the third embodiment of the temperature sensor of the present invention.

In FIG. 4, the third embodiment is similar to the first embodiment except that one end of the ceramic sheet 46a is coated by a coating layer 46b made of a ceramic material so that a sensing resistor 47 is embedded in the ceramic substrate 46 while the other end of the ceramic sheet 46a is not coated by the coating layer 46b. In the third embodiment, the coating layer 46b covers all the surfaces of the one end of the ceramic sheet 46a having the resistor 47, while in the second embodiment the coating layer 42 covers only the surface having the resistor 42 thereon. Similar to the second embodiment, leads are connected to the sensing resistor, and parts of the leads are coated by the coating layer 46b also. The other parts of the leads and a resistor for dividing voltage are coated by a glass layer.

In a method of making the third embodiment of the present invention, one end of the green ceramic sheet 1 is dipped into a ceramic slurry so that the end having the resistor 2 is coated by the ceramic coating. The green ceramic sheet is fired with the ceramic coating so as to form a unitary piece.

Figure 5:
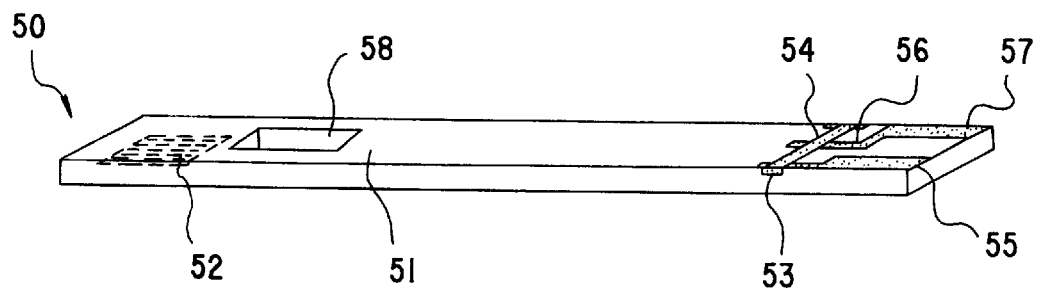
FIG. 5 is a perspective view of the fourth embodiment of the temperature sensor of the present invention.

In FIG. 5, the fourth embodiment of the present invention is similar to the first embodiment except that the ceramic substrate 51 of temperature sensor 50 is formed with a through hole 58 between a sensing resistor 52 in one end of the ceramic substrate and a resistor 54 for dividing voltage in the other end of the ceramic substrate so as to reduce the heat flow between the sensing resistor 52 and the voltage-dividing resistor 54 through the ceramic substrate. When the sensing resistor 52 is exposed to high temperatures, the voltage-dividing resistor 54 is kept at much lower temperatures, resulting in a longer service life of the resistor 54. As shown in FIG. 5, temperature sensor 50 also includes side connection 53, terminal pads 55 and 57, and pad 56 for dividing voltages. These components correspond to those described above in connection with FIG. 1.

Preferably, the through hole 58 is formed close to the sensing resistor 52. The through hole 58 extends in the thickness direction of the ceramic substrate 51. The resistor 52 is embedded in an end of the substrate 51.

Figure 6:
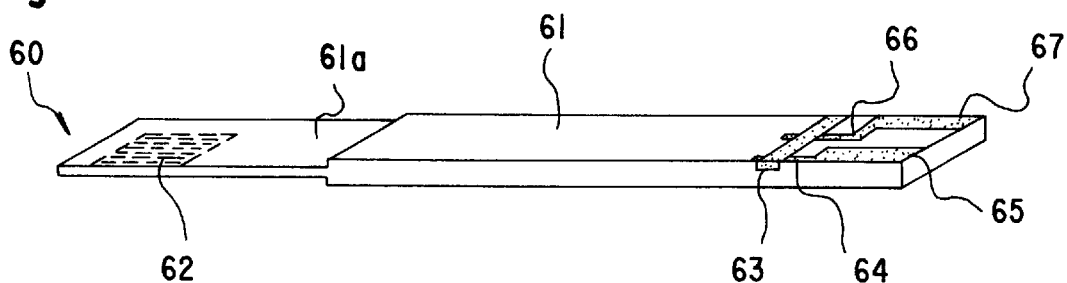
FIG. 6 is a perspective view of the fifth embodiment of the temperature sensor of the present invention.

In FIG. 6, the fifth embodiment of the present invention is similar to the first embodiment except that an end 61a of the ceramic substrate 61 of temperature sensor 60 is thinner than the other parts of the ceramic substrate 61 so as to reduce the heat flow between the sensing resistor 62 embedded in the thin end 61a and the voltage-dividing resistor 64 in the other end through the ceramic substrate 61. When the sensing resistor 62 is exposed to high temperatures, the voltage-dividing resistor 64 is kept at much lower temperatures, resulting in a longer service life of the resistor 64. As shown in FIG. 6, temperature sensor 60 also includes side connection 63, terminal pads 65 and 67, and pad 66 for dividing voltages. These components correspond to those described above in connection with FIG. 1.

In the temperature sensor of the present invention, the sensing resistor is embedded in the ceramic substrate thereby the sensing resistor does not easily deteriorate. An electrical resistance value of the voltage-dividing resistor is adjusted so as to decrease variation in the output voltage of the temperature sensor. Moreover, where the voltage-dividing resistor has larger electrical resistance than the sensing resistor has, the temperature sensor has improved precision in determining temperatures.

What is claimed is:

1. A temperature sensor comprising:
   a ceramic substrate having a first end and a second end:
   a sensing resistor, being embedded in said ceramic substrate at said first end, having a positive temperature coefficient of resistance;
   a first pair of leads connected to said sensing resistor, wherein electric current can be applied to said sensing resistor through said first pair of leads;
   a second pair of leads connected to said sensing resistor; and
   a voltage-dividing resistor disposed at said second end of said ceramic substrate, and electrically connected to said sensing resistor by means of said second pair of leads, said voltage-dividing resistor having an electrical resistance value such that upon applying electric current having a certain fixed value to said sensing resistor, a voltage, which can be detected between said second pair of leads and is indicative of a change in temperature of the sensing resistor, is generated across said sensing resistor, said voltage being divided so that an output voltage between one of said second pair of leads and at least a portion of said voltage dividing resistor is adjusted to be a predetermined value.

2. The temperature sensor of claim 1, wherein said voltage-dividing resistor has a temperature coefficient of resistance, an absolute value of which is smaller than the positive temperature coefficient of resistance of said sensing resistor.

3. The temperature sensor of claim 2, wherein the absolute value of the temperature coefficient of resistance of the voltage-dividing resistor is not greater than half of the positive temperature coefficient of resistance of said sensing resistor.

4. The temperature sensor of claim 1, wherein at 25° C. said sensing resistor has an electrical resistance value that is smaller than the electrical resistance value of said voltage-dividing resistor.

5. The temperature sensor of claim 1, wherein at 25° C. said voltage-dividing resistor has electrical resistance larger than twice as much as the electrical resistance of said sensing resistor.

6. The temperature sensor of claim 1, wherein said voltage-dividing resistor is coated onto a surface of said ceramic substrate, and said temperature sensor further comprises a glass layer wherein said voltage-dividing resistor is coated with said glass layer.

7. The temperature sensor of claim 1, wherein said sensing resistor, said voltage-dividing resistor, said first lead, and said second lead are printed so as to form a film.

8. The temperature sensor of claim 1, wherein said sensing resistor contains at least one of platinum, rhodium, nickel, and tungsten.

9. The temperature sensor of claim 1, wherein said sensing resistor consists essentially of a cermet containing a ceramic and at least one of platinum, rhodium, nickel, and tungsten.

10. The temperature sensor of claim 1, wherein said sensing resistor contains platinum.

11. The temperature sensor of claim 1, wherein said ceramic substrate is formed with a through hole between said sensing resistor and said voltage-dividing resistor so as to reduce heat flow between said sensing resistor and said voltage-dividing resistor through said ceramic substrate.

12. The temperature sensor of claim 1, wherein said ceramic substrate has a planar shape, and wherein the one end having said sensing resistor is thinner than the other end having said voltage-dividing resistor so as to reduce heat flow between said sensing resistor and said voltage-dividing resistor through said ceramic substrate.

13. The temperature sensor of claim 1, wherein said voltage-dividing resistor is connected in parallel with said sensing resistor.

14. A temperature sensor comprising:
   a ceramic substrate;
   a sensing resistor, embedded in said ceramic substrate and having a positive temperature coefficient of resistance;
   a first pair of leads connected to said sensing resistor, wherein electric current can be applied to said sensing resistor through said first pair of leads;
   a second pair of leads connected to said sensing resistor, wherein a voltage across said sensing resistor can be detected between said second pair of leads; and
   a voltage-dividing resistor electrically connected to said sensing resistor, said voltage-dividing resistor having an electrical resistance value such that upon applying electric current having a certain fixed value to said sensing resistor, an output voltage indicative of a change in temperature of the sensing resistor and having a predetermined value is generated across said sensing resistor when the sensing resistor is at a first temperature; said output voltage being detected between one of said second pair of leads and at least a portion of said voltage dividing resistor.

15. The temperature sensor of claim 14, wherein said ceramic substrate has two ends, said sensing resistor is disposed in one of said two ends, and said voltage-dividing resistor is disposed in the other of said two ends.

16. The temperature sensor of claim 14, wherein said voltage-dividing resistor is connected in parallel with said sensing resistor.

* * * * *